Aug. 16, 1927.
H. D. CHURCH
1,639,486
HEADLIGHT MOUNTING
Filed June 1, 1926
2 Sheets-Sheet 1
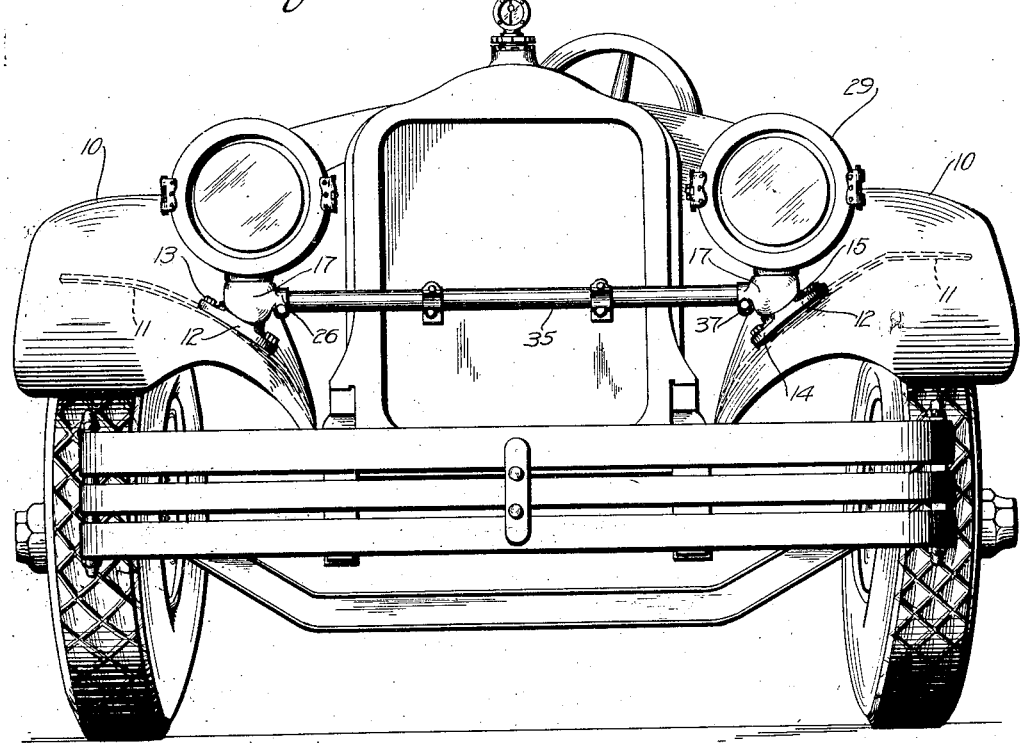
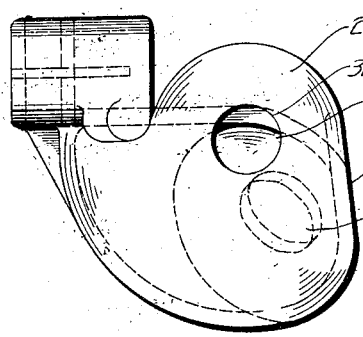
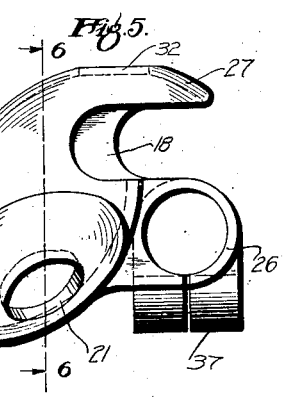
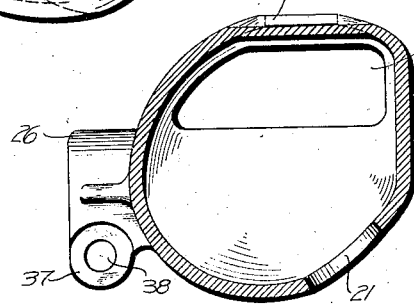
INVENTOR
HAROLD. D. CHURCH.
BY
ATTORNEY Aug. 16, 1927. 1,639,486
H. D. CHURCH
HEADLIGHT MOUNTING
Filed June 1, 1926 2 Sheets-Sheet 2
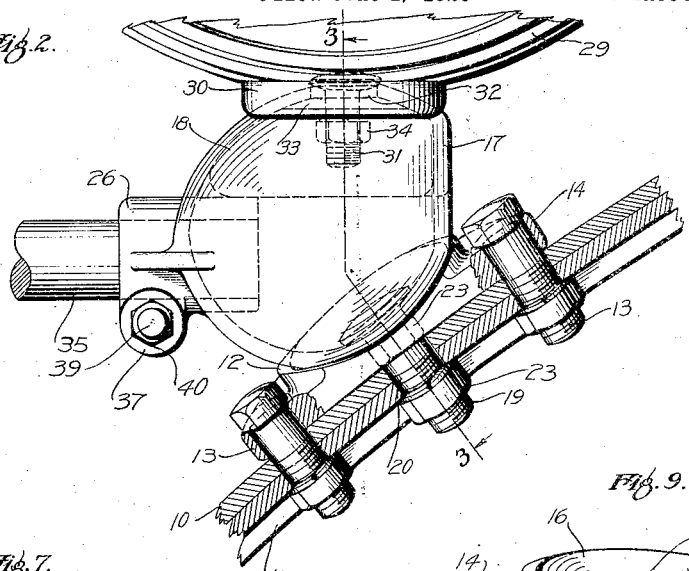
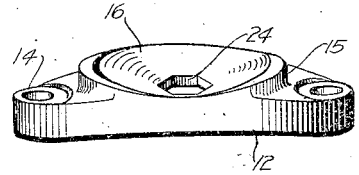
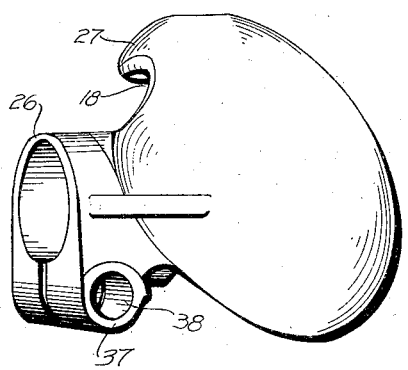
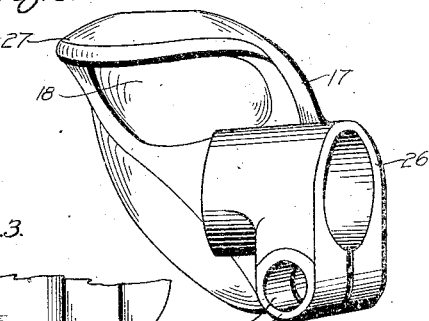
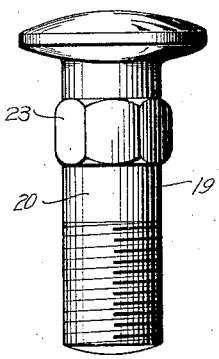
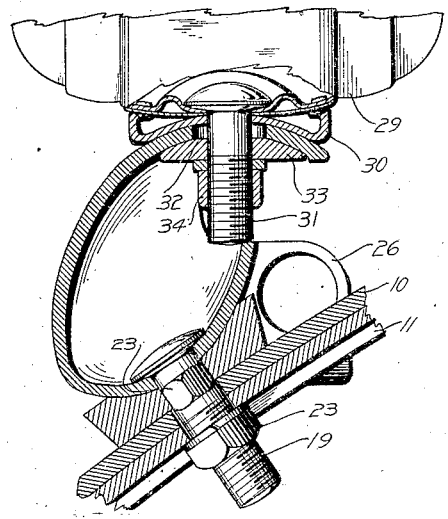
INVENTOR
HAROLD D. CHURCH
BY A. H. Edgerton
ATTORNEY Patented Aug. 16, 1927.

1,639,486

UNITED STATES PATENT OFFICE.

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO.

HEADLIGHT MOUNTING.

Application filed June 1, 1926. Serial No. 112,924.

This invention relates to headlights and particularly to improvements in headlight mountings for automotive vehicles.

One of the objects of the invention is to provide a headlamp support that embodies a coupling member which will facilitate the adjustability of the headlamp and accommodate adjustments compensatory with variations occurring in the alignment of the associated supporting elements.

Another object of the invention is to provide a lamp supporting member having a universality of adjustment and adequate securement with its supporting adjuncts.

Another object of the invention is to provide a lamp supporting device comprising an agroupment of parts which may be mounted in proper relation to one another on a bench and then applied to the vehicle as a unit and adjusted with the least expenditure of time and trouble.

Another object of the invention is to provide a lamp supporting device having the connecting parts accessibly located but housed in concealed positions for aesthetic reasons.

Other objects of the invention and the invention itself will be readily apparent from the following description of an embodiment of my invention, and in which description reference will be had to the accompanying drawings, illustrating said embodiment for the purpose of explaining my invention.

Referring to the drawings:

Figure 1 is a view in front elevation of a motor vehicle embodying the invention.

Figure 2 is a detail view in front elevation of the lamp mounting mechanism and fragmentary portions of the related parts, some of which are shown in section in the intent of clearness.

Figure 3 is a section in the plane of the line 3—3 of Figure 2.

Figure 4 is a detail plan view of one of the lamp supporting members.

Figure 5 is a side elevation of the same.

Figure 6 is a detail section taken in a plane indicated by the line 6—6 on Figure 5.

Figures 7 and 8 are perspective views of the supporting member shown in Figures 4 and 5.

Figure 9 is a perspective view of another member of the lamp supporting mechanism.

Figure 10 is a detail of the bolt employed in the construction illustrated in Figures 2 and 3.

The vehicle shown in Figure 1, includes a pair of fenders 10, supported in the usual way by arcuate brackets 11. Upon each fender there is a socket 12, preferably mounted on the fender apron at a point intermediate its junction with the frame and the crown of the fender. The base of the socket is constructed to conform to the contour of the apron and is secured thereto by bolts 13, which pass through apertured ears 14, on the socket 12, and aligned openings in the fender apron and bracket 11. The upper face of the socket is formed with an annular boss 15, having a concave spheroidal seat 16, in which a complemental bearing surface of one of the walls of a lamp supporting member 17, is retained.

The supporting member is preferably hollow, and as illustrated, is formed with an opening 18, in the upper portion of its rear wall which is provided to facilitate the assembly of the bolt 19, with the supporting member and its associated adjuncts. The shank 20, of this bolt passes through an enlarged aperture 21, in the lower wall of the supporting member and through aligned apertures in the socket 12, fender apron and bracket 11. The head 22, of the bolt engages the inner wall of the supporting member and conforms to its spheroidicity in the zone of the aperture 21. The bolt 19, is formed with a rectilinear shoulder 23, intermediate its ends, which in the present case, engages the similarly formed aperture 24, in the socket 12, and prevents the rotation of the bolt when a nut 25, which is screw threaded on the lower end of the bolt, is tightened to secure the supporting member in its adjusted position. By thus forming the various elements of this portion of the assembly it will be seen that the supporting member may be rotated in the socket 12, and oscillated, within the limits permitted by the clearance in the aperture 21, until the desired adjustment is attained and then rigidly clamped in place by the single adjustment of the nut 25.

The lamp supporting member 17, may be of any suitable configuration, but in the construction herein shown, it is generally ellipsoidal and provided with a laterally disposed boss 26, and a concavo-convex extension or ledge 27, depending from a rear portion of its upper wall above the opening 18. This ledge serves to support the headlamp 29, and may be of any suitable form to accommodate the connecting means provided on different types of headlamps. The preferable connection, however, is of the type adapted to accommodate adjustments made by oscillating the lamp upon a spherical seat such as the spheroidal ledge 27, illustrated. This connection comprises a disc 30, secured to the headlamp 29, and adapted to oscillate upon the ledge 27, and to be secured thereto by the stud 31, which passes through the aperture 32, and upon which there is a plano-convex washer 33, and a nut 34.

As illustrated in Figure 1, the headlamp support embodies a brace or tie rod 35, which is adjustably attached to the supporting member 17, for the purpose of maintaining the various members of the assembly in their relative adjusted positions and also for the purpose of minimizing the deleterious effects of vibration to the lamp. To facilitate the adjustability of the rod 35, the bosses 26, within which the ends of the rod are held, are formed with split bosses 37, apertured at 38, to receive clamping bolts 39, and nuts 40. After the position of each headlamp and supporting member is determined, and the nuts 34 and 23, have been drawn down into their clamping position, the nuts 40, may be tightened and the entire organization will be firmly connected and rigidly secured.

It is apparent that this invention embraces a headlamp supporting mechanism embodying advantageous improvements in the complete assembly, but it will be noted that the various elements comprising the entire structure, when considered each as a unit, are constructed to perform their individual function independent of the specific agroupment herein illustrated and described.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

What I claim is:

1. A headlamp support comprising a hollow pivotal supporting member having apertured spheroidal bearing surfaces, a headlamp pivotally supported on one of the said bearing surfaces, a stud affixed to the said headlamp and extending through said aperture, a nut within said hollow supporting member coacting with said headlamp stud, an apertured socket engaged by another of said bearing surfaces, a bolt having a convex head engaging an inner wall of the said supporting member, and extending through said aperture in the supporting member, a rectilinear shoulder intermediate the ends of the bolt engaged by said socket aperture and a nut upon a portion of the shank of the bolt extending through said socket.

2. A headlamp support comprising a hollow pivotal supporting member having apertured spheroidal bearing surfaces, a headlamp pivotally supported on one of the said bearing surfaces, a stud affixed to the said headlamp and extending through said aperture, a nut within said hollow supporting member coacting with said headlamp stud, an apertured socket engaged by another of said bearing surfaces, a bolt having a convex head engaging an inner wall of the said supporting member and extending through said aperture in the supporting member, a rectilinear shoulder intermediate the ends of the bolt engaged by said socket aperture, a nut upon a portion of the shank of the bolt extending through said socket, and a tie rod detachably secured to said supporting member.

3. A headlamp support comprising a supporting member having apertured bearing surfaces formed substantially as the surface of a portion of the hollow sphere, a headlamp pivotally supported on one of the said bearing surfaces, and securing means projecting from the headlamp through the aperture to secure the lamp to the supporting member, an apertured socket engaged by another of said bearing surfaces, a bolt having a convex head engaging an inner wall of the said supporting member and extending through said aperture in the supporting member, a rectilinear shoulder intermediate the ends of the bolt engaged by said socket aperture, a nut upon a portion of the shank of the bolt extending through said socket, and a tie rod detachably secured to said supporting member.

4. A headlamp support comprising a supporting member having apertured bearing surfaces formed substantially as the surface of a portion of the hollow sphere, a headlamp pivotally supported on one of the said bearing surfaces, and securing means projecting from the headlamp through the aperture to secure the lamp to the supporting member, an apertured socket engaged by another of said bearing surfaces, a bolt having a convex head engaging an inner wall of the said supporting member and extending through said aperture in the supporting member, a rectilinear shoulder intermediate the ends of the bolt engaged by said socket aperture and a nut upon a portion of the shank of the bolt extending through said socket.

5. In combination with a head lamp and fender, a support affixed to the fender having a concavely spherical bearing surface, a concavely spherical bearing affixed to the head lamp, a supporting member intermediate the head lamp and fender, having convexly spherical bearing surfaces projected within each of the said concave bearing surfaces, and means for retaining the connection between the supporting member and the fender and the supporting member and the lamp, while permitting a limited universal relative movement between the joined parts.

In testimony whereof I hereunto affix my signature this 27th day of May, 1926.

HAROLD D. CHURCH.